March 6, 1956  M. S. JASINSKI  2,737,225
PIPE FLARING DEVICE
Filed Sept. 20, 1951
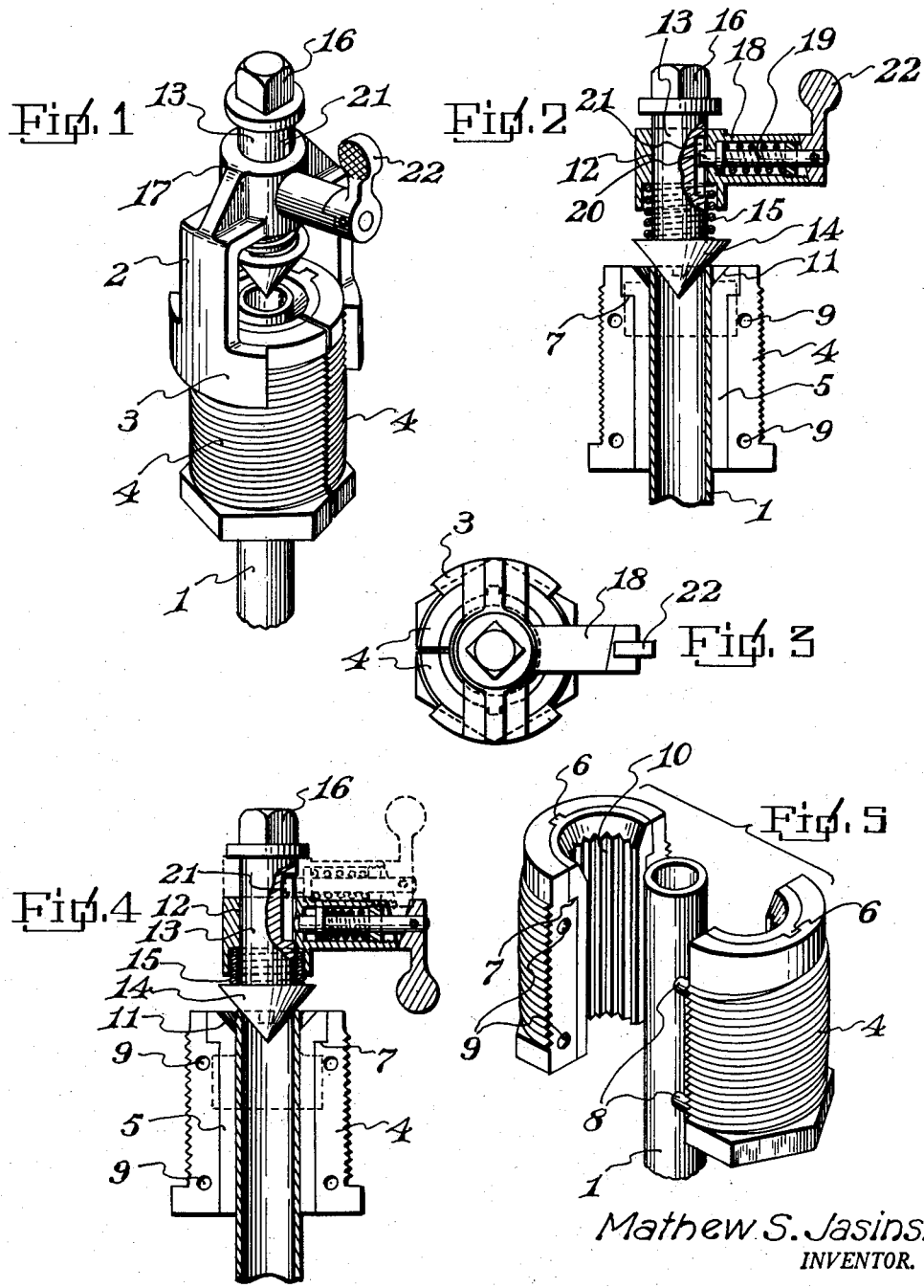
Mathew S. Jasinski
INVENTOR.

United States Patent Office 2,737,225
Patented Mar. 6, 1956

2,737,225

PIPE FLARING DEVICE

Mathew S. Jasinski, Tulsa, Okla.

Application September 20, 1951, Serial No. 247,408

4 Claims. (Cl. 153—81)

The invention relates to pipe flaring devices particularly adapted for flaring the ends of pipes or tubes, and particularly the larger sizes pipes or tubes, and has for its object to provide a device of this kind wherein the flaring cone is intermittently placed under expansive action of an expansion spring while in engagement with the tubing end, and intermittently rotated so there will be a constant pressure which will flare the tubing end without splitting the tube end as the metal is drawn.

A further object is to provide a pipe flaring device comprising registering threaded members having bushing inserts for gripping various sizes of tubing, and onto the outer end of which registered threaded members a yoke is threaded, which yoke is threaded inwardly on the registering members, intermittently, for placing tension on an expansion spring so the expanding of the tube end is accomplished by the rotation of the flaring cone under its spring pressure.

A further object is to provide the threaded yoke with latching means for latching the cone shaft to the yoke or allowing the cone shaft to be rotated independent of the rotation of the yoke.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the pipe flaring device, showing the application to a tube end.

Figure 2 is a vertical transverse sectional view through the device showing the cone pressure spring extended and the cone shaft latched preparatory to the advancement of the yoke.

Figure 3 is a top plan view of the flaring device.

Figure 4 is a view similar to Figure 2, but showing the position of the parts after a yoke advancing operation, and the tensioning of the cone spring.

Figure 5 is a detail perspective view of the threaded tube gripping members.

Referring to the drawing, the numeral 1 designates a tube, the upper end of which tube is to be flared for forming an element of a tube coupling. The flaring device comprises an inverted U-shaped yoke 2, the lower ends of the arms of which terminate in arcuate members 3 being correspondingly threaded on their inner faces. The members 3 are adapted to be threaded on the exteriorly threaded pipe gripping elements 4. Pipe gripping elements 4 are provided with bushings 5, segmentally shaped in cross section, and which bushings are adapted to be changed from time to time, according to the outside diameter of the tube to be flared. The upper ends of bushings 5 are provided with lugs 6, which lugs prevent rotation of the bushings in the members 4, and the bushings are also provided with shoulders 7 for preventing longitudinal displacement in the threaded members 4, during a pipe flaring operation.

Threaded members 4 are provided with dowels 8 received in the apertures 9 so the thread of the threaded members 4 will be in proper registry when the yoke members 3 are threaded downwardly thereon, as shown in Figure 1, for clamping the tube end between the bushings 5 in a manner whereby the teeth 10 of the bushings will grip the periphery of the tube end to resist any radial displacement of the tube end in the device. The upper ends of the liners 5 are bevelled, as shown at 11, and at the desired angle for the flaring operation.

Slidably mounted in a bearing 12 of the transverse portion of the yoke is the shaft 13, the lower end of which terminates in a flaring cone 14 on the axis of the tube, and which cone is normally urged downwardly towards the tube end by an expansion spring 15. The upper end of the cone shaft 13 is provided with a wrench receiving head 16. Extending outwardly from one side of the transverse portion 17 of the yoke is a latch barrel 18 having a spring actuated latch 19 therein, and which latch is normally urged inwardly so the latch end 20 may enter the vertically elongated slot 21 in the side of the cone shaft 13. The latch may be held outwardly in disengaged position, as shown in Figure 4, by rotating the finger lever 22, which will move the position of the bevelled engaging surfaces of the member 22, and the latch barrel end.

In operation, the desired size liners are placed in the members 4 and the members 4 are then placed in registry on opposite sides of the tubing end. Following this operation, the yoke 2 is threaded onto the outer ends of the members 4, as shown in Figure 1, with the latch in latched position. This threading operation continues until the expansion spring 15 is compressed, as shown in Figure 4. Then, the latch is unlatched, as shown in full lines in Figure 4, and following this, a wrench is placed on the upper end of the shaft 13 and the cone is rotated independent of the yoke, but under the constant expansive action of the spring 15. It has been found, by having the expansive action of the spring 15 of the proper spreading power, excessive pressure is not applied to the tube end, which causes splitting, with the screw type spreaders, at present designed. If additional spreading operation is necessary, after the first threading operation, the yoke is advanced further on the members 4, with the shaft latched for compressing the spring 15, and the above operation continued.

In other words, the yoke and the shaft are latched together to rotate unitarily for the purpose of compressing the spring. As the shaft and the yoke rotate, it will be understood that the shaft and the flaring cone are axially advanced with the yoke being threaded on the members 4 and the spring being placed under further tension. When the spring is sufficiently compressed, the yoke is disengaged from the shaft and further rotation of the shaft will spin the cone on the pipe end, the cone being under the continuous and constant pressure of the compressed spring. If the spring needs to be loaded further, the latch will be used to lock the yoke to the shaft and then additional rotation of the shaft will bring the yoke down further on the members 4 and further compress the spring, since the shaft will be also moved axially toward the pipe.

From the above it will be seen that a pipe flaring device is provided particularly adapted for larger tube ends where the danger of splitting by the excessive drawing of the metal is obviated.

The invention having been set forth what is claimed as new and useful is:

1. A pipe end flaring device comprising threaded clamping members, liners disposed in said clamping members and adapted to grip the periphery of the pipe end, the upper ends of said liners being bevelled, a yoke arching the outer ends of the clamping members, said yoke being U-shaped, the ends of said yoke arms being arcuate and threaded on the clamping members for the clamping operation and for intermittently advancing the yoke towards the clamping members, a cone shaft slidably mounted and axially movable in the transverse portion of the yoke, a cone carried by the inner end of the cone shaft, spring means for normally forcing said cone towards the clamping members on the axis thereof and holding the cone against the pipe end under a continuous and constant pressure and latching means for latching said cone shaft for rotation with the yoke to compress the spring when the yoke is again advanced on the clamping members or allowing independent rotation of the cone shaft.

2. A device as set forth in claim 1 wherein the spring means comprises an expansion spring interposed between the cone and the transverse portion of the yoke.

3. A device as set forth in claim 1 wherein the spring means comprises an expansion spring surrounding the cone shaft and interposed between the transverse portion of the yoke and the cone.

4. A device as set forth in claim 1 wherein the latching means comprises an outwardly extending latch barrel carried by the transverse portion of the yoke, a latch member slidably mounted in the barrel, spring means for normally forcing said latch member towards the cone shaft, a longitudinal latch slot in the side of the cone shaft and means carried by the latch shaft and cooperating with the latch barrel for retracting the latch shaft out of engagement with the cone shaft.

References Cited in the file of this patent

UNITED STATES PATENTS

| | | |
|---|---|---|
| 1,101,434 | Hatton | June 23, 1914 |
| 1,840,470 | Schneider | Jan. 12, 1932 |
| 1,955,913 | Holsclaw | Apr. 24, 1934 |
| 2,297,885 | Graf et al. | Oct. 6, 1942 |
| 2,370,089 | Swyers | Feb. 20, 1945 |
| 2,604,139 | Franck | July 22, 1952 |